(No Model.)
C. H. CHASE.
ASH SIFTER.
No. 372,204. Patented Oct. 25, 1887.
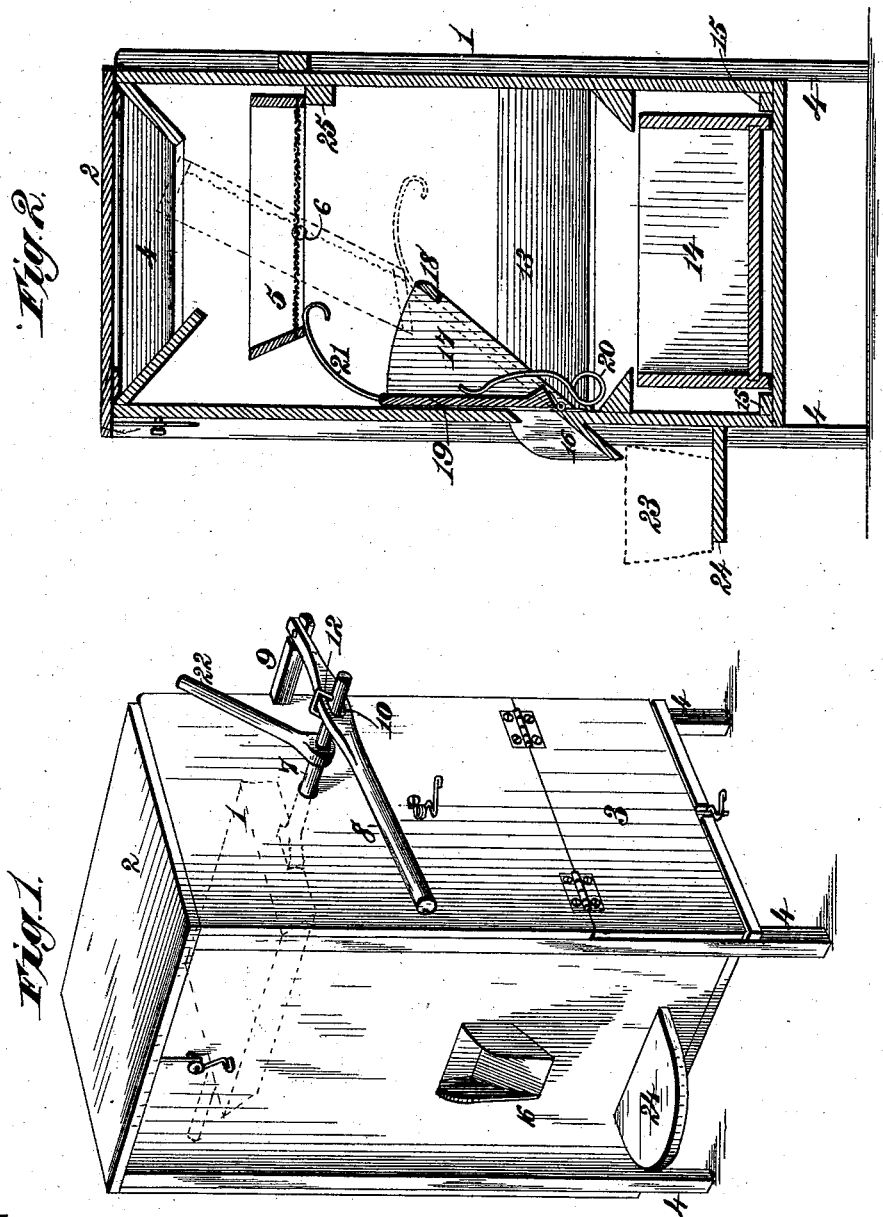
Witnesses.
Robert Garrett,
J. A. Rutherford
Inventor:
Charles H. Chase,
By James L. Norris,
Atty.

UNITED STATES PATENT OFFICE.

CHARLES H. CHASE, OF LOWELL, MASSACHUSETTS.

ASH-SIFTER.

SPECIFICATION forming part of Letters Patent No. 372,204, dated October 25, 1887.

Application filed February 17, 1887. Serial No. 227,910. (No model.)

*To all whom it may concern:*

Be it known that I, CHARLES H. CHASE, a citizen of the United States, residing at Lowell, in the county of Middlesex and State of Massachusetts, have invented new and useful Improvements in Ash-Sifters, of which the following is a specification.

My invention relates to that class of ash-sifters in which a reciprocating and dumping sieve is supported in the upper part of a dust-proof cabinet, while a removable drawer or ash-receptacle is located in the lower part of the said cabinet, which is provided in front with an automatic chute for discharging the coal and cinders after they have been separated from ashes.

The object of my invention is to improve such ash-sifters; and it consists in the features of construction and combination of devices hereinafter described and claimed, reference being made to the accompanying drawings, in which—

Figure 1 is a perspective view of my improved ash sifter. Fig. 2 is a central vertical section of the same, the parts as arranged for sifting being shown in full lines, while dotted lines are employed to indicate their position in discharging the separated coal.

Referring to the drawings, the numeral 1 designates a rectangular cabinet, having a hinged lid or cover, 2, at its top and a door, 3, in one side at its lower end. If desired, this cabinet may be provided with legs, as shown.

In the upper part of the cabinet, beneath the cover 2, is formed a hopper, 4, of any suitable construction. Beneath this hopper a rectangular sieve, 5, is supported by means of journals 6 and 7, which project from the opposite ends of the sieve and extend through openings in the sides of the cabinet. A shaking-lever, 8, is pivoted to an arm, 9, projecting on one side of the cabinet, and this lever 8 is provided with a slot, 10, through which the outer end of the journal 7 is passed, a bifurcated pin, 12, being passed through the journal on each side of the lever to hold said journal and lever in engagement. By oscillating the lever 8 the journals 6 and 7, with attached sieve, will be reciprocated across the upper part of the cabinet, thereby separating the coal, cinders, and ashes placed in said sieve. The separated ashes falling from the sieve pass through a hopper, 13, into a drawer or removable box, 14, placed in the bottom of the cabinet, and having suitable handles to facilitate its removal and transportation. This drawer may rest on guides or rails 15 in the bottom of the cabinet.

In the front of the cabinet 1, between the sieve 5 and lower hopper, 13, is a discharge-chute, 16, the inner end of which consists of triangular flaring wings 17, connected at about the center of the cabinet by a cross-bar, 18, that forms a stop for an automatic chute-apron, 19, hinged at the lower edge of the external chute-opening. This hinged apron 19 is normally held, by means of a spring, 20, in a vertical position between the wings 17, so as to cover the external chute-opening and prevent the escape of ashes while the sieve 5 is being reciprocated or shaken.

To the upper end of the hinged apron 19 are attached inwardly-curved arms 21, which project beneath the front edge of the sieve. When the sieve 5 is dumped by means of a tilting-lever, 22, on the journal 7, the front edge of the sieve, by bearing on the arms 21, forces the hinged apron 19 downward and inward, and discharges the contents of the sieve (unburned pieces of coal and cinders) over said apron between the wings 17, and out through the external chute, 16, into a receptacle, 23, placed on a shelf or support, 24, in front of the cabinet.

When the coal and cinders are dumped through the chute-opening 16 and the tilting-lever 22 relieved from pressure, the action of the spring 20, pressing on the under side of the chute-apron 19, forces it into a vertical position to close the chute-opening, and thereby causes the arms 21 to return the sieve 5 to a horizontal position. In order to prevent the sieve 5 from tilting backward, a stop bar or guide, 25, is placed along the rear wall of the cabinet beneath the rear edge of the sieve.

When the sieve 5 is to be filled, and also when it is to be dumped, it should be brought by the lever 8 to a central position, or about midway between the opposite side walls of the cabinet.

While the sifter is in use the lid 2 and door 3 are to be closed and fastened, thus preventing the escape of dust and ashes and avoiding the ordinary trouble and annoyance usually incident to the sifting of coal-ashes in or near dwellings.

Having thus described my invention, what I claim is—

1. In an ash-sifter, the combination of an inclosing cabinet having a lid at its top and a door in its lower part, an upper hopper, a lower hopper, a movable sieve supported between said hoppers by means of sliding journals projecting through the opposite sides of the cabinet, a lever for shaking or reciprocating said sieve, a lever for dumping or tilting the sieve forward, an ash-receptacle located in the bottom of the cabinet, and an automatic chute located in the front part of said cabinet between the sieve and the lower hopper, said chute being operated by the dumping sieve in discharging coal or cinders, and actuated by a spring to close the chute and return the sieve to a horizontal position after its contents are dumped, substantially as described.

2. In an ash-sifter, the combination of the cabinet 1, having a chute-opening, 16, and internal wings, 17, on each side of said opening, the chute-apron 19, hinged to the lower edge of the chute-opening between said wings and provided with inwardly-projecting arms 21, the spring 20, for normally holding said apron in a vertical position, and the dumping-sieve 5, adapted to engage the arms on said apron, substantially as described.

In testimony whereof I affix my signature in presence of two witnesses.

CHARLES H. CHASE.

Witnesses:
LOUIS H. KILESKI,
MYRON E. PIERCE.